UNITED STATES PATENT OFFICE.

GUSTAV REININGER, OF BERLIN, GERMANY, ASSIGNOR TO THE FIRM OF CYANID-GESELLSCHAFT MIT BESCHRAENKTER HAFTUNG, OF BERLIN, GERMANY.

COMPOUND FOR HARDENING OR CASE-HARDENING IRON OR STEEL.

No. 801,339.     Specification of Letters Patent.     Patented Oct. 10, 1905.

Application filed December 6, 1904. Serial No. 235,743.

*To all whom it may concern:*

Be it known that I, GUSTAV REININGER, chemist, a subject of the Grand Duke of Baden, residing at 3 Spandauerberg, Berlin-Westend, Kingdom of Prussia, German Empire, have invented new and useful Compositions of Matters for the Hardening or Case-Hardening of Iron and Steel, of which the following is a specification.

This invention relates to a composition of matters for the hardening or case-hardening of iron and steel. According to the present invention one uses cyanamids of alkalies or alkaline earths or their nitrogenous derivatives—e. g., free cyanamid, dicyandiamid, tricyantriamid, (melamin)—either alone or in mixture with each other or with certain materials able to furnish carbon for the formation of cyanids—as, for instance, organic animal refuse, such as horn, claws, leather. As these materials contain a certain percentage of nitrogen their admixture will not lower the percentage of nitrogen in the resulting mixture in the degree as would be the case by using other carbonaceous materials.

The processes of hardening or case-hardening hitherto used are the following, viz: 1. A process in which iron to be case-hardened is packed in a mixture consisting of organic animal refuse—such as horn, claws, leather-powder, and blood-powder, mixed with soot, sodium chlorid, or sal-ammoniac—whereby a powder is obtained rich in carbon and nitrogen. 2. A process in which calcium or barium carbid is used as a packing material, the carbids being destroyed by means of carbondioxid or carbonic acid. The carbon thus derived will then have a case-hardening effect. 3. A process comprising the use of highly-carbonizing flames, in which case the separated carbon takes a very fine form and will be absorbed by the red glowing material to be hardened. 4. By the aid of electricity and a carbon electrode. With reference to these processes the mixtures referred to in process 1 have the disadvantage of soft spots appearing in the objects to be case-hardened. In process 2 the carbids are undesirable, inasmuch as they easily cause explosions when the object just taken out of the case-hardening box is cooled in water, unless the adhering and partly-decomposed carbid is most carefully removed. The method referred to in processes 3 and 4 take a long time to perform and are very expensive.

According to the present invention it has been found that all the inconveniences mentioned will be avoided by the use of cyanamids of alkalies or alkaline earths or their nitrogenous derivatives—e. g., free cyanamid, dicyandiamid, tricyantriamid, (melamin)—as, for example, calcium cyanamid pure or in its crude state, ($CaCN_2+C$.) Practical tests have proved that the calcium cyanamid mixed with charcoal or carbonized animal refuse or other carbonaceous material is well adapted for the purpose of case-hardening. The case-hardening effect can be augmented by adding a salt of an alkali or alkaline earth or other flux—for instance, chlorid of sodium, potassium, or calcium, carbonate of sodium or potassium—to the calcium cyanamid used as packing material for the iron or steel to be case-hardened, so that only at high temperatures will alkali cyanid be formed and at which temperatures the material to be hardened will absorb carbon. A loss of cyanogen by rapid heating can thus be avoided.

Cyanamid, dicyandiamid, ($C_2N_4H_4$,) and tricyantriamid (melamin) ($C_3H_6N_6$) operate like the calcium cyanamid, but with increased force. The corresponding combinations of barium may also be used. The use of these materials will be found especially advantageous in connection with the manufacture of tools, files, armor-plates, and cemented steel.

For carrying out the present invention I cover the metal—a tool, file, or armor-plate, for instance—with cyanamid, or the compounds of cyanamid, with alkaline earths with or without carbon and a suitable salt of alkali or alkaline earth and heat the covered metal. I may also heat the metal and place it then into the said substances. After the said treatment the metal is brought into water.

The amount of the substances is chosen by the skilled workman, according to the desired degree of the hardness and the desired velocity of the process. In using a higher temperature or a larger amount of hardening substances one will attain a larger degree of hardness than with a lower temperature or a smaller amount of hardening substances in the same space of time. One will also be able to carry out the process of hardening for obtaining the same degree of hardness with a higher temperature or a higher amount of hardening substances in a smaller space of time than in using a lower temperature or a smaller amount of hardening substances. The skilled workman will find the conditions suitable for his special purpose by experiments.

The amount of carbon or carbonaceous substances or the salts of alkali or alkaline earths to be added to the cyanamid (dicyandiamid, tricyantriamid) or the compounds of it with alkaline earth will be found by the skilled workman. According to the conditions of applying the mixture the additions and the amount of them will modify the result. A suitable mixture is, for instance, eighty parts, by weight, of calcium cyanamid, and twelve parts, by weight, of charcoal. Another suitable mixture is eighty parts, by weight, of calcium cyanamid, twenty-four parts, by weight, of carbonized animal refuse, and twelve parts, by weight, of carbonate of sodium free of water.

What I claim as my invention, and desire to secure by Letters Patent, is—

1. A compound for hardening or case-hardening of iron and steel containing cyanamid.

2. A compound for hardening or case-hardening of iron and steel containing compounds of cyanamid with alkaline earths.

3. A compound for hardening or case-hardening of iron and steel containing a mixture of compounds of cyanamid with alkaline earths and carbon.

4. A compound for hardening or case-hardening of iron and steel containing a mixture of compounds of cyanamid with alkaline earths, carbon and an alkali.

In witness whereof I have signed my name, this 14th day of November, 1904, in presence of two subscribing witnesses.

G. REININGER.

Witnesses:
HENRY HASPER,
WOLDEMAR HAUPT.